INVENTOR.
Erik Arne Sabel,
BY Parker & Carter
Attorneys.

Oct. 21, 1969  E. A. SABEL  3,473,746
WEARING PARTS FOR CRUSHERS
Filed Oct. 13, 1966  2 Sheets-Sheet 2
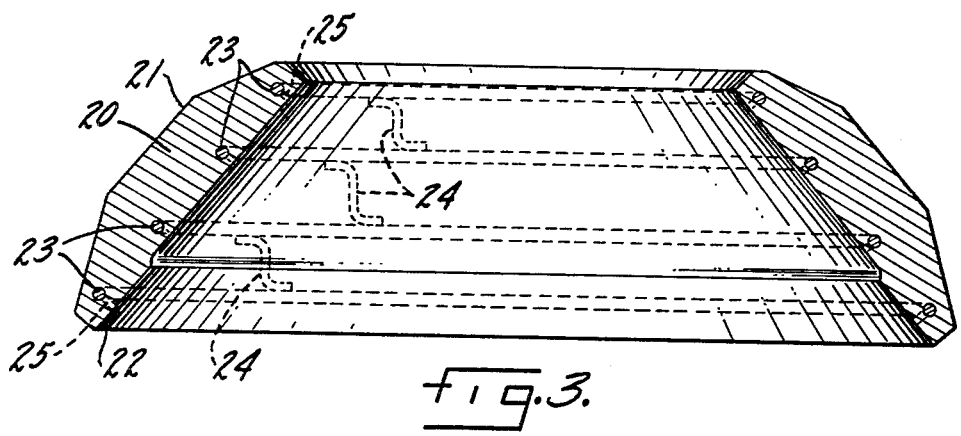
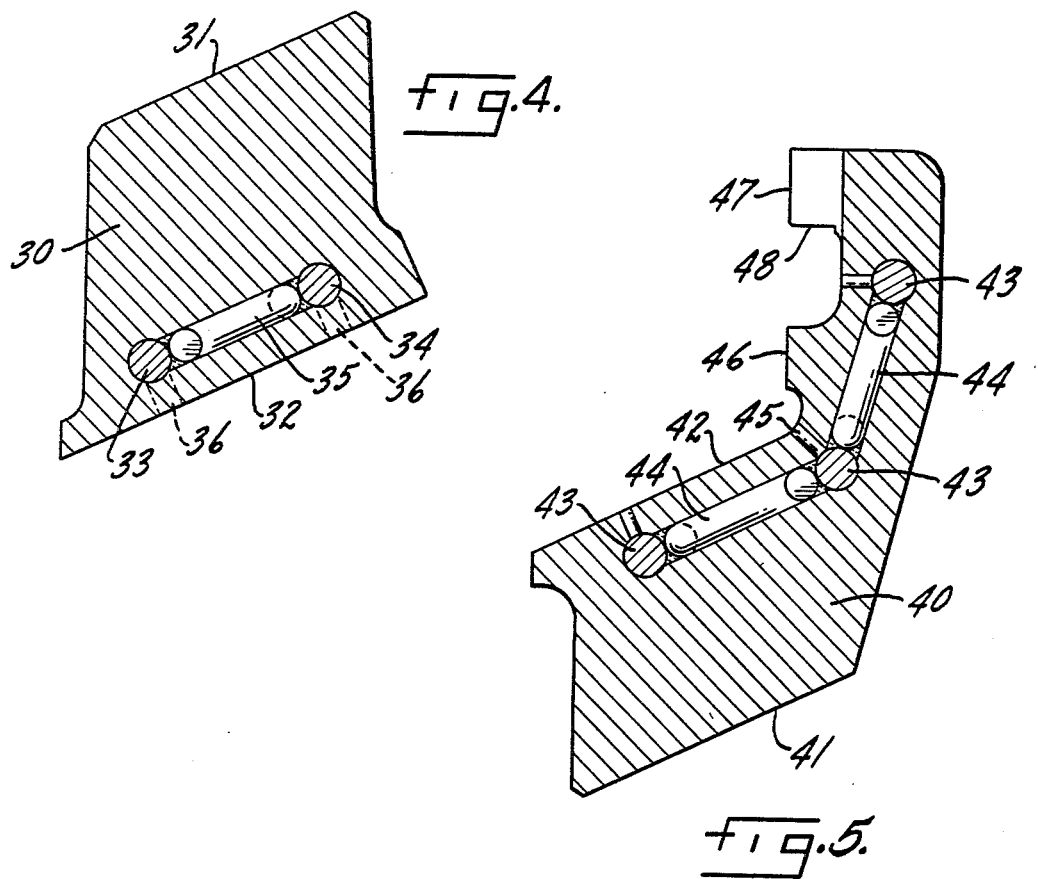
INVENTOR.
Erik Arne Sabel,
BY Parker & Carter
Attorneys.

United States Patent Office 3,473,746
Patented Oct. 21, 1969

3,473,746
WEARING PARTS FOR CRUSHERS
Erik Arne Sabel, Ojebyn, Sweden
Continuation-in-part of application Ser. No. 549,678,
May 12, 1966. This application Oct. 13, 1966, Ser.
No. 586,413
Claims priority, application Sweden, Jan. 12, 1966,
342/66
Int. Cl. B02c 1/10, 13/28, 15/10
U.S. Cl. 241—299         10 Claims

ABSTRACT OF THE DISCLOSURE

This is a wearing part for use in gyratory crushers and the like in the form of a generally truncated, circumferential body of hard and relatively brittle wear-resistant material containing a framework of rods of a metal having a relatively high tensile strength. If the wearing part cracks or breaks in use, the framework will retain the dimensional stability of the over-all member.

---

This application is a continuation-in-part of application Ser. No. 549,678, filed May 12, 1966, now forfeited.

The present invention relates to wear taking bodies or members for mills, for example, for cone or gyratory crushers. The particular structures shown are bowl liners or mantles for use in crushers in which a head is gyrated within a surrounding bowl. The bowl liner is secured to the bowl, and the mantle is mounted on the head, these two wearing parts defining a crushing cavity into which material is discharged from above for reduction. It will be understood that the crushing parts, the liner and mantle, take tremendous wear, and wear away rapidly. A major purpose of the invention is to provide a wear taking part and a method of making it which permits the use of hard but brittle metals.

SUMMARY OF THE INVENTION

The choice of materials for such bowl liners and mantles has hitherto been limited, in accepted practice, to metals which have relatively poor wear taking characteristics, but which have a toughness which enables them to stand the crushing stresses without breaking or cracking. Manganese steel has been a generally accepted material for bowl liners and mantles, but, although tough, lacks the hardness of some other materials, and wears at a more rapid rate than is desirable. The hard steels, which have the highest wear resistance, are prevailingly brittle, and their brittleness involves the risk of formation of cracks or breaks. This brittleness has constituted a serious obstacle to the utilization of those metals which have the highest wear resistance.

By means of the present invention the drawback of brittleness has been overcome by using a body formed or poured of a metal of very high resistance to wear. I propose to use a hard and brittle metal which is reinforced or retained by rods or rings of a different metal, which may be considered a framework or frame, having great tensile strength and resistance to fracture. Whereas as a matter of convenience I talk in terms of a reinforcing structure, it will be realized that it might equally well be described as a retaining or stabilizing structure which is effective in the event of cracking or breakage of the brittle metal body.

As will appear below, the protective body, or wearing part, is cast from metals or alloys having originally, or by treatment, a high Brinell hardness. The metal employed is cast about a suitably shaped retaining or stabilizing structure which, as will appear below, is coated with a suitable coating to prevent it from being sintered to or joined directly to the metal of the wearing part. Since the enclosed stabilizing structure is separated by a suitable coating from any sintering to or joinder with the outer brittle metal of the wearing part, and is of a tougher metal, it is not affected by cracking or breakage of the outer brittle body. In the event of such breakage, since there is no clearance between the coating of the inner structure and the abutting mass of the outer structure, cracking or breakage of the outer structure does not result in any separation of the parts of the outer structure. Thus, although the brittle metal bowl liner or mantle may be cracked, the inner retaining structure prevents any damaging separation along the crack or cracks.

BRIEF DESCRIPTION OF THE DRAWINGS

The wearing part may be of various shapes, but I illustrate herein specific examples.

Referring to the drawings:

FIGURE 3 is an axial section through a mantle to be applied to the head of a gyratory or cone crusher;

FIGURE 4 is a section through a mantle for a crusher having a different shape of head; and FIGURE 5 is a section through a liner.

Like parts are indicated by like symbols throughout the specification and drawings.

The wear body, generally designated 1, comprises a cast cone mantle or liner 2 having embedded therein one or more axially spaced rings 3, 4 and 5, of reinforcing material or positioning elements or rods such as steel of high tensile strength and resistant to fracture, the rods or rings being of successively greater diameter toward the base of the conical mantle or liner. There is a spacing, separation or nonfusion interface of the cast metal of the cone liner from the rings by a separating layer 5a of a mixture of plastic and sand.

As an example of material for the cone mantle or liner 2, it may be of a casting of perlitic, carbidic white cast iron, or martensitic, carbidic, chrome-nickel alloyed cast iron, sometimes known as Nihard. Castings from such metals are known to be brittle and hard, and have good wear characteristics.

Figure 2:
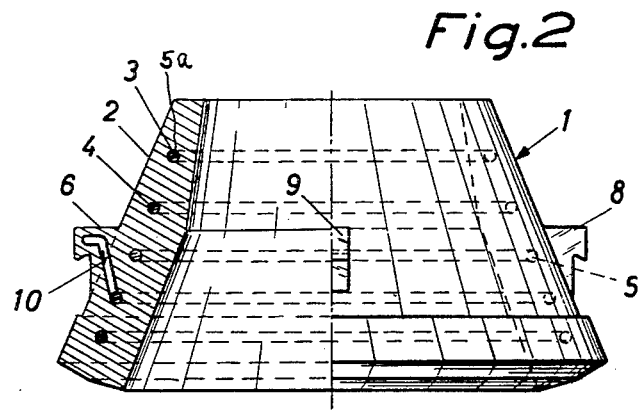
FIGURE 2 is a section on the line 2—2 of FIGURE 1.

For the mounting of the cone or mantle, hooks or abutments 6, 7, 8 and 9 are provided on the cone liner and each may be reinforced in the manner shown for abutment 6 in FIGURE 2, wherein an arm 10 enters the abutment.

Prior to the casting of the cone lever 2 about the rings the latter are annealed, and blasted, pickled and heated in an oven to a temperature of 250° to 300° C. At such a temperature the retaining structure is placed in a box more or less filled with a mixture of about 93% sand of fineness No. 110 (American Foundryman Society) and about 7% powdered resin such as phenol-formaldehyde molding powder. The box and contents are then rotated and agitated. The heat of the retaining elements softens the resin which, in turn, causes the sand to adhere and more resin to adhere to the adhered sand which has then become heated. In this manner a layer of mixed sand and resin is built up on the retaining elements ranging from about half a millimeter to about 5 millimeters according to mass of the retaining elements and the duration of agitation, as well as the temperature of the retaining element when it is placed in the box. After the retaining elements are taken from the box they are then baked to a hard crust at about 200° C. to 400° C.

This crust prevents the cast metal of the cone liner from becoming sintered onto or fused to the retaining structure and may permit relative movement of the cooling and shrinking cone with respect to the retaining structure so that internal stresses due to the presence of the retaining structure are minimized. The hot casting metal which is of a temperature sufficient to partially decompose part of the resin produces an amount of gas to form a film between the casting metal and the bulk of the crust, and so retards further decomposition.

The composite separating layer of at least partially decomposed resin and sand is yieldable enough, in the casting, to allow relative movement of the reinforcement and casting proper. However, when the retaining structure has the brittle outer body cast about it, there is no clearance between the separating layer of the retaining structure and the casting itself.

The rings may be held in spaced relationship within the casting mold by tie members to form a cage-like structure or frame or by radial stays from a central support.

The primary purpose of the above described retaining structure is to maintain the brittle outer body intact. If it cracks, the brittle metal is held together along the faces of the cracks by the retaining structure. If cracking results into a separation into parts, these parts are held by the retaining structure against relative movement.

With reference to FIGURE 3, the wear-taking body, in the form of a mantle for a conic head, is indicated at 20. It has an outer wear-taking surface 21, opposed to the particles to be crushed, and a rear surface 22 adapted to be opposed to the surface of the cone. The retaining structure in the example of FIGURE 3 includes four rings 23 of rod material welded to form complete circles. Assuming that the bottom diameter of the mantle thus formed is of the order of 4 feet to 6 feet, it may, for example, be practical to employ rod of ⅝-inch stock, or less. The rods 23 may be connected by intermediate spacers 24 which may conveniently be made of somewhat lighter rod stock. Each spacer may be, for example, in the form shown in FIGURE 3, and, in any event, is formed so as to be welded or secured at each end to adjacent rods 23. Enough spacers are employed to provide, in effect, a self-supporting cage of rod stock. In addition, I provide back face spacers 25 which extend to the rear face of the mantle. These back face spacers, when the mantle is poured about the retaining structure, serve to support and center the retaining structure within the space to be filled by the brittle metal of which the mantle is formed.

Figure 1:
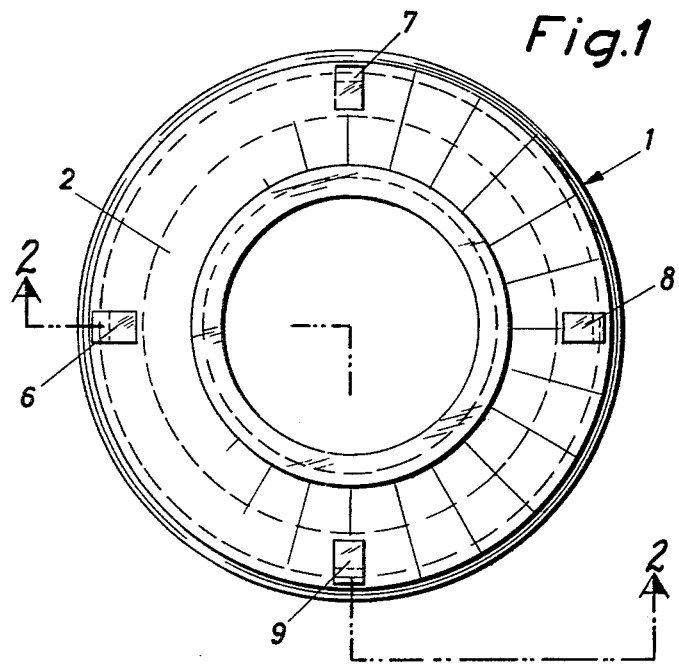
FIGURE 1 is a plan view of a bowl liner for a gyratory crusher.

Any suitable mold may be employed. Any suitable rod stock may be employed, but it will be understood that it will be of relatively high tensile strength, and will be resistant to fracture. For example, the range of ultimate tensile strength may be as low as 45,000 or less, and as high as 100,000 or more. When the mantle has been poured about the retaining structure the result is a mantle of brittle metal circumferentially reinforced, and reinforced from end to end by a reinforcing or retaining structure of greater tensile strength. Actually, the internal structure may not necessarily perform any continuing function until cracking takes place. Or, under some circumstances, it may have a reinforcing structure. However, what I consider of maximum importance is that the retaining structure be always available to prevent cracks from separating and to prevent relative displacement of broken parts. It will be noted that the retaining structure is positioned much closer to the backing face of the mantle than to its working face. This is important, to provide a maximum use or working wear of the mantle body. As described in connection with the form of FIGURES 1 and 2, the retaining structure may be annealed, and blasted, pickled and heated, and covered with a suitable covering of sand and powdered resin. This procedure is described above. The result is a brittle mantle with a relatively high tensile retaining structure or reinforcement, and with no joinder or direct metallic connection between the mantle body and the reinforcement.

FIGURE 4 illustrates an equivalent reinforced mantle, but of somewhat different shape. The mantle 30 is shown with an upper working or particle engaging surface 31, and a lower or backing surface 32, opposed to a suitable gyrated head. The retaining structure is shown as including an outer ring 33 and an upper, inner ring 34 connected by spacers 35. As a matter of convenience, the spacers have abutting portions which may be welded to each ring, and a connecting spacer which holds the two rings in predetermined relative position. The rings are, as in the earlier forms of the device, formed of a metal or rod stock having relatively high tensile strength. Back face spacers 36 are also employed, as shown in the form of FIGURE 3. Likewise, it will be observed that the retaining structure is close to the backing surface, but remote from the working or particle engaging surface, providing a substantial mass of metal which permits a long life of the mantle. It will be understood, of course, that when the retaining structure is suitably positioned in a suitable mold the brittle metal of the body of the mantle is poured, and embeds the retaining structure without fusion. The back face spacers 36 perform the same function as the back face spacers 25 of FIGURE 3, and the retaining structure is properly positioned and centered in the mold for pouring.

FIGURE 5 indicates a bowl liner for a crusher having a gyrated head with a relatively low angle of slope. The liner 40 has a working or material-engaging surface 41 and a backing face or surface 42. The retaining structure is shown as including three rods 43, formed in closed rings, and connected by suitable spacers 44 which may be welded thereto. Back face spacers 45 are likewise employed. The particular bowl liner shown in FIGURE 5 has a circumferential spacing flange 46 and an upper locking or securing flange 47. Any suitable securing members may be positioned to penetrate beneath its lower surface or surfaces 48. However, the securing means do not of themselves form part of the present invention, and are not herein indicated. Actually, what is important in connection with the form of FIGURE 5, as of the other forms, is the combination of an inner retaining structure of relatively high tensile strength which extends circumferentially about the wearing part, which includes, preferably, two or more closed rings connected to each other, and which further includes back face spacers to provide for proper centering and support of the retaining structure when the brittle metal mass is poured about it.

It will be realized that many changes may be made in shape, number and disposition of parts. It will also be understood that the specific shaping of wearing parts, including bowl liners and mantles, may be widely varied. The specific shapes do not of themselves form a part of my invention.

It will be realized further that a wide variety of materials may be used, but I have described herein metals which are well adapted for the practice of my invention.

It will be understood, of course, that by the term "reinforcement" I wish to include the internal retaining structure above described, in which an outer brittle casting surrounds or is poured about an inner retaining or reinforcing structure of a metal having relatively high tensile strength.

I claim:

1. In a wear taking part for cone crushers and the like, a generally frusto-conic cast cover body adapted to take wear due to contact with the material being crushed, the frusto-conic body being of hard and brittle material, a retaining structure within the frusto-conic body formed of a metal having high tensile strength and resistance to fracture, and a separating layer of slightly yieldable material between the retaining structure and the frusto-conic body, adapted to permit relative movement of the retaining structure and the frusto-conic body, while preventing fixed union of the retaining structure and the body, the frusto-conic body being in direct engagement with the separating layer.

2. The structure of claim 1 characterized in that the brittle material is a metal having a Brinell hardness number as high as 400, the retaining structure being of annealed steel.

3. The structure of claim 2 characterized in that the separating layer is constituted by sand and a small amount of plastic binder therefor.

4. The structure of claim 1 characterized in that the frusto-conic cover body is provided with radially outwardly projecting hooklike mounting lugs having therein reinforcing elements continuous with the retaining structure.

5. As a new article of manufacture, a wearing part for gyratory crushers and the like including a hollow truncated, conic body of hard and brittle material, and one or more metal retaining members embedded in said body, of high tensile strength, and in the form a closed frame, said members being of a material resistant to fracture, and including a separating layer between the retaining members and the surrounding brittle material effective to insulate the frame from the crushing load on the conic body, said layer being of slightly yieldable material, and being adapted to permit slight relative movement of the retaining members and the conic body.

6. As a new article of manufacture, a circumferential wearing part for a gyratory crusher, which includes a body of hard and relatively brittle wear resistant metal, having a working face adapted to be opposed to particles to be crushed and an opposite backing face adapted to be opposed to a backing member in the crusher, said body having embedded therein a retaining structure including a retaining framework of a metal having a relatively high tensile strength and relatively resistant to fracture, said framework being located substantially closer to the backing face than to the working face, the retaining structure not being fused to and therefore separated from the body.

7. In a cone or spindle crusher, a cast cover body to take wear due to contact with material being crushed, said body being of hard and brittle material, reinforcing members having high tensile strength and resistant to fracture embedded within the cast body, and a separating layer of slightly yieldable material between the members and the body to permit relative movement of the members and the cast body.

8. In a crusher as claimed in claim 7, said hard and brittle material being a metal having a Brinell hardness number at least as high as 400 and said members being of annealed steel.

9. In a crusher as claimed in claim 7, said yieldable material being a layer of sand and a small amount of carbonic binder therefor.

10. In a crusher as claimed in claim 7, said body being in the shape of a truncated cone, and some reinforcing elements being ring shaped, said body being provided with radially projecting hooklike mounting lugs integral therewith, and some of the reinforcing elements being within the lugs.

References Cited
UNITED STATES PATENTS

| | | | |
|---|---|---|---|
| 1,494,265 | 5/1924 | Martindale | 241—299 |
| 1,588,297 | 6/1926 | Bolton | 241—299 |
| 1,774,556 | 9/1930 | Jones | 241—299 X |
| 2,120,697 | 6/1938 | Finnegan | 241—293 X |

FRANK T. YOST, Primary Examiner